F. E. IVES.
COLOR PHOTOGRAPHY.
APPLICATION FILED AUG. 9, 1917.
1,306,904.
Patented June 17, 1919.
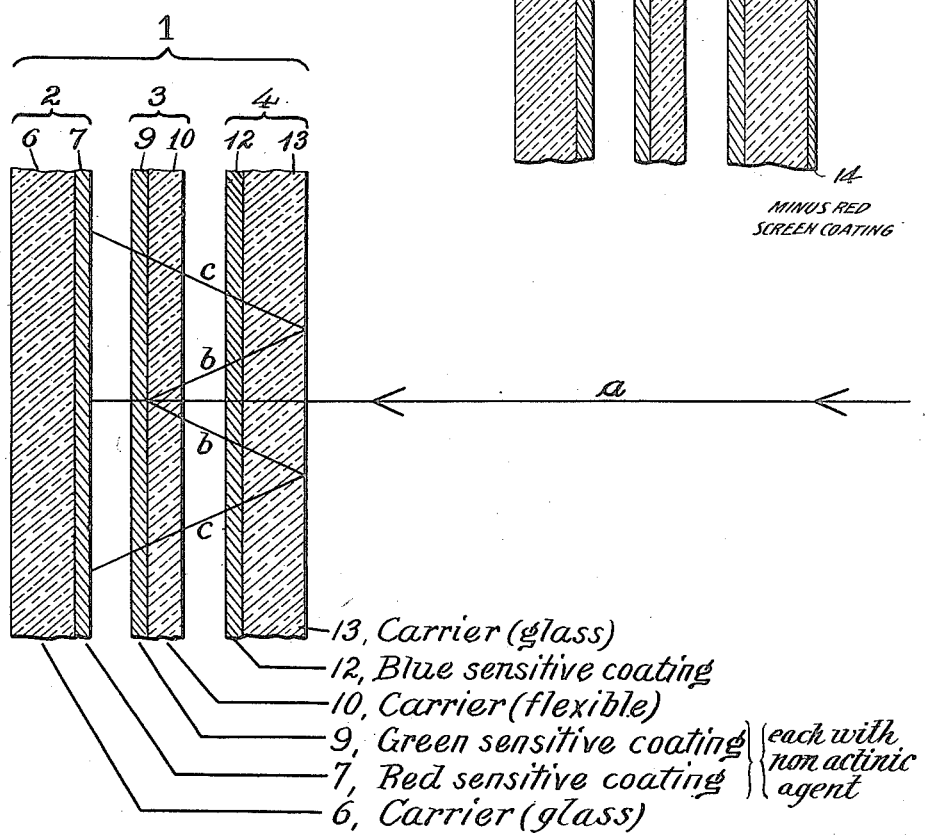

UNITED STATES PATENT OFFICE.

FREDERIC EUGENE IVES, OF PHILADELPHIA, PENNSYLVANIA.

COLOR PHOTOGRAPHY.

1,306,904.

Specification of Letters Patent. Patented June 17, 1919.

Application filed August 9, 1917. Serial No. 185,234.

*To all whom it may concern:*

Be it known that I, FREDERIC EUGENE IVES, a citizen of the United States, residing at Philadelphia, in the county of Philadelphia and State of Pennsylvania, have invented certain new and useful Improvements in Color Photography, of which the following is a specification, reference being had therein to the accompanying drawing.

This invention relates to the art of color photography, and more particularly to a novel system of color photography and a "plate-pack" having the advantages of greater efficacy and more correct resulting color photographs than heretofore. A particular object is to minimize the tendency to halation in photographic plate-packs. By the term plate-pack I refer to any assemblage or set of flexible or rigid plates, films or other members, whether two, three or more in number, an example of which is shown in my prior Patent No. 927,244, dated July 6, 1909.

The drawing which accompanies and forms part of this specification comprises Figure 1 showing the general nature of a color photography plate-pack and the difficulty of diffusion which is known as halation, with inscriptions showing one embodiment of the present invention; and Fig. 2 shows a modification thereof. In my said prior patent the pack comprises a front member consisting of a transparent carrier or glass having a blue sensitive coating at its rear face; a rear member consisting of a carrier having a red sensitive coating at its front face; and a middle member provided with a green sensitive coating; there being a yellow layer or surface screen at the rear of or upon the blue sensitive coating to shield the other members from the blue light; and there being a red layer or surface coating or screen in front of or upon the red sensitive member to shield it from the green light.

Referring generally to the arrangement of the assemblage or pack 1 shown in the figure or diagram, this comprises the rear member 2, the middle member 3, and the front member 4, which are red, green, and blue sensitive, respectively. The rear member 2 comprises the glass or other carrier 6 bearing the red sensitive coating 7. The member 3 comprises the green sensitive coating 9 upon the celluloid or other carrier 10. The front member comprises the blue sensitive coating 12 upon the carrier 13.

The halation difficulties arose from the fact that the light beam $a$ from the objective has to pass through a plurality of sensitive coatings and one or more transparent carriers so that the light incident upon one coating might be diffusely reflected frontward, for example, as indicated at $b$, $b$, in the diagram, so as to reach and be rearwardly reflected from the front surface of a transparent carrier as indicated at $c$, $c$, so as to objectionably affect one or more of the sensitive coatings. With a three member pack, one or both of the rear members, including their haloid layers and their carriers, tend to give the frontward reflections and each carrier tends to reverse this stray light giving the injurious rearward reflection. Being due to rearward reflections from front surfaces, this halation phenomenon may be termed "front halation" and is quite different, because more serious, in color photography than the usual or rear halation encountered in ordinary photography.

This difficulty is almost negligible with respect to the front or blue sensitive member 4, for several reasons. The fact that the film is in adhering or optical contact with the glass minimizes the internal reflections of blue light, and the inherent nature of the silver bromid film assists in this result so that substantially no blue light is diffusely reflected back to the front surface to cause front halation. The halation may be further minimized by incorporating a yellow stain in the body of the blue sensitive layer or its emulsion, as this effectively restrains the transmission of blue light in any direction. At the same time this serves as a yellow screen, taking the place of the superficial yellow layer of my prior patent and protecting the rear sensitive members against the blue light.

As will be seen from the diagram, the really serious halation occurs with respect to the rear, that is the green and the red sensitive members. The condition described with respect to the front member of the pack does not apply to the other members, for different reasons, for example, because silver bromid is able to diffusely reflect a great deal of red and green light, and to diffusely transmit a considerable percentage of red light, as would a piece of thin yellow paper; and of this unabsorbed actinic light a substantial amount is reflected frontward and thence rearward to the sensitive surfaces with such diffusion as to produce objectionable halation in the middle and rear members of the pack. The present invention operates to minimize the halation so that it will no longer be objectionable, and without preventing due actinic action in making the exposure. Generally speaking, my plan for this purpose is to combine or incorporate within or upon the front of the sensitive layer a suitable non-actinic ingredient in a quite small amount which will very greatly reduce and practically eliminate halation while not seriously restraining the desired actinic action so as to reduce the speed of the sensitive layer.

In a sense I thus deliberately restrain to a minor extent the action of the actinic light in order to secure the desired results. Thus referring to the rear member I may introduce into the body of or in front of the red sensitive layer 7 a small amount of minus-red or blue coloring matter, preferably a water-soluble dye. While this to a slight extent prolongs the necessary exposure, it will serve to reduce the reflection and therefore halation to about four times that extent. For example, if a blue surface screening of the red sensitive member be sufficiently strong to reduce the action of red light by 50%, this would serve to reduce the amount of light reflected and capable of halation, to about 12½%, eliminating 90% of the halation.

I prefer, however, that the blue screening dye be contained or diffused in the body of the colloid layer 7, and in that case the actual gain is far greater, due to the fact that the screening of the sensitive particles through the layer is progressive with the depth, so that such screening reduces the sensitive factor or speed to a quite immaterial extent while very effectively reducing the reflection or halation factors. A slightly lower density in the negative would result, but this would be unobjectionable and in many cases advantageous.

Obviously, the introduction of the minus-red layer or ingredient may be combined with the introduction of the red screen previously referred to which serves to exclude green light. A combination of red introduced for screening purposes as before mentioned, and minus-red for reducing halation, may be secured by adopting a suitable tone of color which sometimes might be answered by a neutral or gray which could be applied superficially or through the body of the red sensitive layer 7.

Substantially the same remarks would apply to the middle or green sensitive member 3, and a water-soluble dye of a minus-green or red color could be introduced within the body of the layer to minimize the halation producing reflections.

The non-actinic ingredients or dyes may be added either to the emulsions before coating, or subsequently by bathing the plates for two minutes in an aqueous solution of the dyes and then drying.

Suitable dye baths for these purposes are as follows: For the green sensitive film: water, 738 c. c.; alcohol, 170 c. c.; sodium salt of p-sulfonaphthalene-azo-a-naphthol-p-sulfonic acid, otherwise known as carmosin M, 1 decigram. For the red sensitive film: water, 738 c. c.; alcohol, 170 c. c.; calcium salt of the disulfonic acid of m-oxy-diethyl-dibenzyl-diamido-triphenyl-carbinol, otherwise known as patent blue, 1 centigram.

By introducing these minus screening colors merely as surface layers, the density of the members remains unaltered and the reduction of halation is substantial although not so great as with body staining. The halation reducing layers need not be in contact with the corresponding sensitive layers. For example, the minus-red screening for the rear member might be applied at some point farther forward or even at the front side of the front member 4, as seen in Fig. 2, in which case it would operate not by reducing the frontward reflection from the silver haloid layers but the relative rearward reflection from the front glass surface and it would consist of a minus-red screen coating 14 in optical contact with the glass 13 and of similar refractive index.

It will thus be seen that I have described a system or method and a plate-pack embodying the principles of the invention and attaining the advantages thereof, and other advantages will be apparent to those skilled in the art. Since many matters of detail such as the order of the steps, the nature or composition of the ingredients, the selection and arrangement of the colors, and other features, may be variously modified without departing from the novel principles involved, I do not intend to limit the invention to such features except in so far as specified in the appended claims.

What is claimed is:

1. In color photography, the method of making a plurality of color representing negatives from a plurality of differently color-sensitized members, comprising screening one of said sensitive members by a non-actinic agent, assembling the members with said screened member behind another of said members, and exposing the assemblage so arranged.

2. The method as in claim 1, and wherein before exposure the rearmost of said members is partially screened both against the color to be recorded and the complementary color.

3. A plate-pack for color photography comprising a plurality of assembled sensitive members, a member behind the front member being screened against halation by a non-actinic agent.

4. A plate-pack as in claim 3, and wherein the screening agent is a removable color material of color minus the color to be recorded by the screened member.

5. A plate pack as in claim 3, and wherein the rear member is also protected by a screen of the color it is to record.

6. A plate-pack for color photography, comprising three members sensitive to the selected primaries respectively, one of the members behind the front member being screened against halation by a non-actinic agent.

7. A plate pack as in claim 6, and wherein all of the members behind the front member are so screened.

8. A plate pack as in claim 6, and wherein the rearmost member is partially screened both against the color to be recorded and the complementary color.

9. As an element of a plate pack, a sensitive member having a screen comprising an agent of the color it is to record for excluding other colors, and an agent of a color minus to said color for reducing halation.

10. As an element of a plate pack a sensitive member containing means for partially screening it both against the color it is to record and the complementary colors.

11. A plate-pack comprising three members, one sensitive to red and screened by a minus-red agent against halation, another sensitive to green and screened by a minus-green agent against halation, and a blue recording member assembled in front of the other two.

In testimony whereof, I have affixed my signature hereto.

FREDERIC EUGENE IVES.